(No Model.)　　　　　　　　　　　　　　　　　2 Sheets—Sheet 1.
E. O. EVANS.
ROADWAY AND VEHICLE THEREFOR.

No. 512,174.　　　　　　　　　　　Patented Jan. 2, 1894.

WITNESSES:　　　　　　　　　　　　INVENTOR:

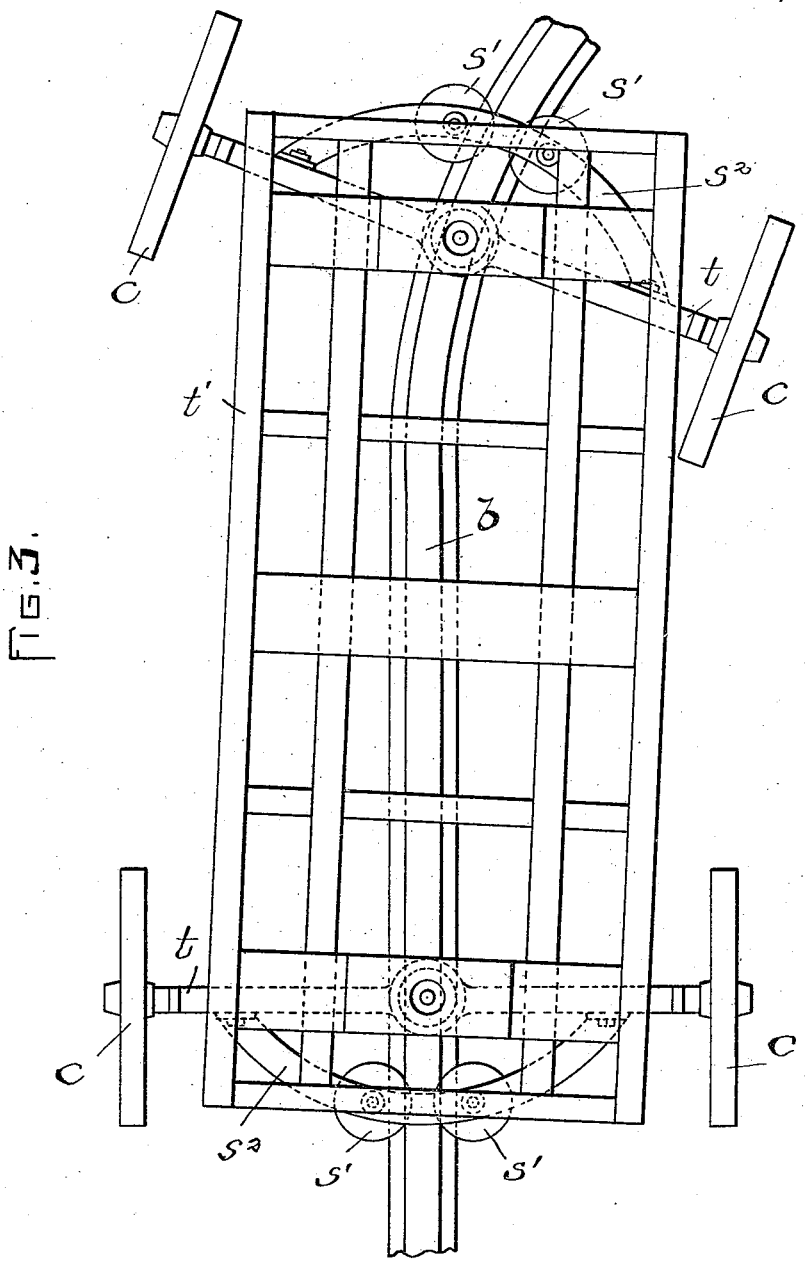

UNITED STATES PATENT OFFICE.

ELMER O. EVANS, OF BOSTON, MASSACHUSETTS.

ROADWAY AND VEHICLE THEREFOR.

SPECIFICATION forming part of Letters Patent No. 512,174, dated January 2, 1894.

Application filed March 31, 1893. Serial No. 468,416. (No model.)

*To all whom it may concern:*

Be it known that I, ELMER O. EVANS, of Boston, in the county of Suffolk and State of Massachusetts, have invented certain new and useful Improvements in Roadways and Vehicles Therefor, of which the following is a specification.

This invention relates to an improvement in roadways and vehicles to travel thereon.

The object of the invention is to provide means whereby a vehicle may be propelled and guided over a roadway having a level surface of unlimited width, on which the traction wheels of the vehicle travel.

To this end, the invention consists in a roadway having an ordinary level surface and no guide-rails for the load-carrying wheels, with a single central rail traversing said surface, for the engagement of horizontal driving-wheels and horizontal guide-wheels carried by the vehicle; in combination with a vehicle having ordinary traction-wheels to travel over the level surface of the roadway and carried by an axle pivotally connected with the frame of the vehicle which supports the body, and horizontally-mounted wheels arranged in juxtaposition so as to bear against opposite sides of the central rail on the roadway and carried by the axle to one side thereof, whereby they guide the vehicle around curves.

The accompanying drawings illustrate the invention applied to a motor and car.

Figure 1:
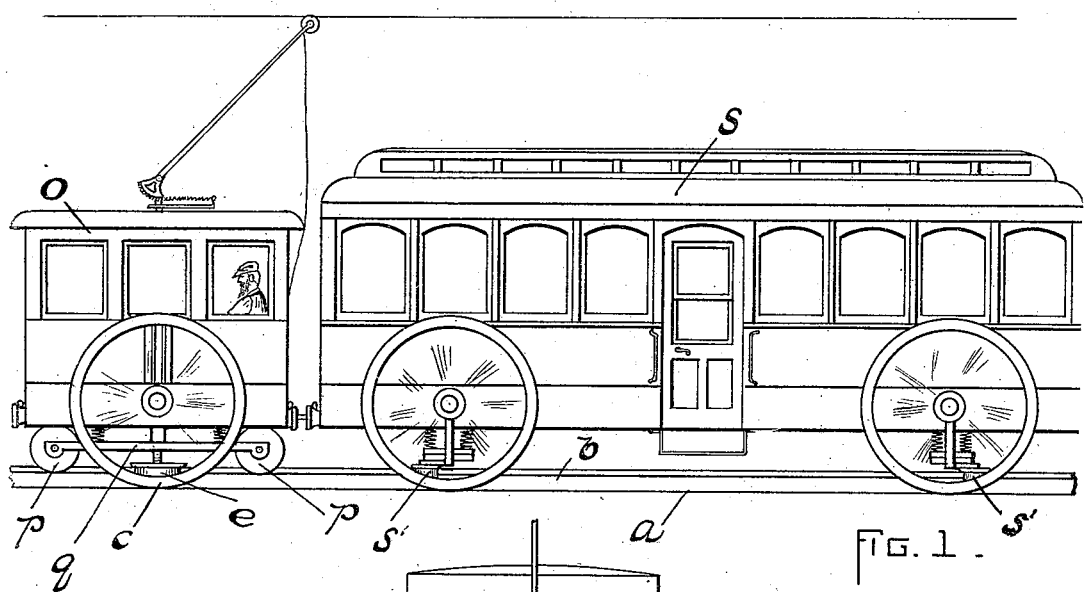
Figure 2:
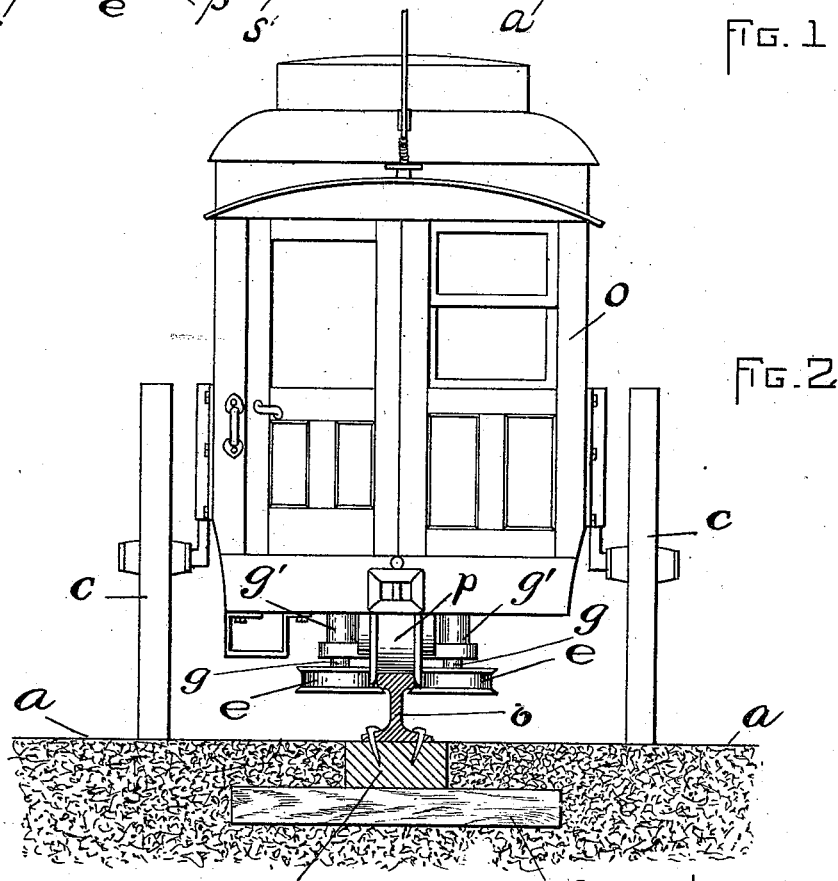

Figure 1 shows a side elevation of the motor and a car coupled thereto. Fig. 2 shows an end view of the motor, with the roadway in section. Fig. 3 shows a plan view of the car, with the body removed.

The same letters of reference indicate the same parts in all the figures.

That portion of the roadway over which the traction-wheels of the vehicle travel is of ordinary construction, having a level surface $a$ of unlimited width, and without any rails or other guide devices for the wheels. The rail $b$ is laid along the middle of the roadway. This rail may be of various forms and materials. An ordinary T-rail is here shown, mounted on a bolster $d'$, which is supported on ties $d^2$.

The carrying-wheels $c$ of the vehicle are of ordinary form, having a flat tread to bear upon and travel over the level surface $a$ of the roadway.

As the invention is here illustrated, the motor $o$ has a single set of driving-wheels $e$; and a single set of side-wheels, which run on the surface $a$ and act as steadying-wheels, and said steadying-wheels are mounted so as to permit vertical vibration to accommodate variations in the road-bed. A pair of flanged guide-rollers or wheels $p$ are supported in a frame $q$ on the motor, and engage the rail. These guide-rollers or wheels prevent lateral vibrations of the motor. Side guiding-rails having been done away with, some means must be employed as a substitute, to properly guide the vehicle around curves; and, referring to Figs. 1 and 3, it will be seen that the axles $t$ are pivotally connected with the car-frame $t'$, and the wheels $s'$ are carried by brackets $s^2$, fastened to the axles and extending out in front and behind. The wheels are supported in the outward-projecting portion of the bracket, and by thus arranging them it will be seen that leverage is gained, wherewith to turn the axle easily in traveling around curves, as illustrated in the drawings. Both axles are pivoted, so as to adapt the car for running in either direction.

I claim—

A roadway having a level surface of unlimited width for the carrying-wheels of a vehicle to travel on without side guide-rails, and a single central rail, in combination with a vehicle having wheels traveling on the level surface of the roadway and carried by an axle which is pivoted to the vehicle-frame, and horizontally-supported driving-wheels carried by the said axle and at one side thereof and engaging opposite sides of the said central rail.

In testimony whereof I have signed my name to this specification, in the presence of two subscribing witnesses, this 28th day of March, A. D. 1893.

ELMER O. EVANS.

Witnesses:
C. F. BROWN,
A. D. HARRISON.